Feb. 28, 1961  V. C. JOHNSON  2,972,792
RESILIENT RIB AND GROOVE SLIDE FASTENERS
Filed May 31, 1955  2 Sheets-Sheet 1
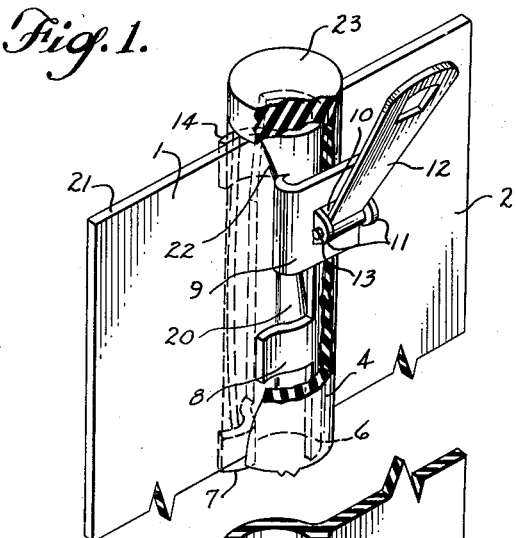
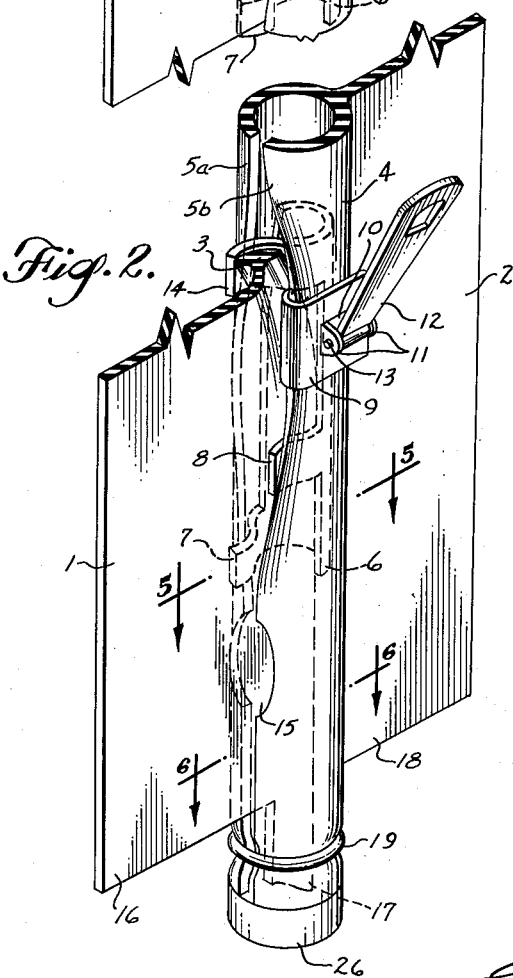
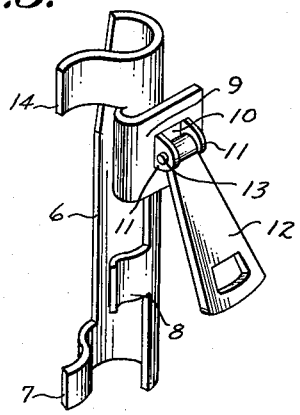
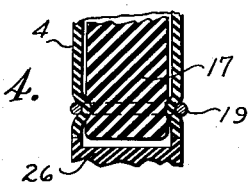
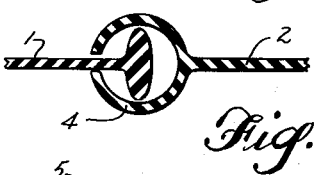
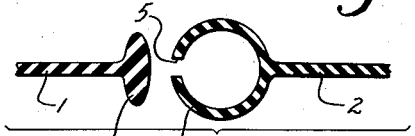
INVENTOR.
VALDIMAR C. JOHNSON
BY
Reynolds, Beach & Christensen
ATTORNEYS

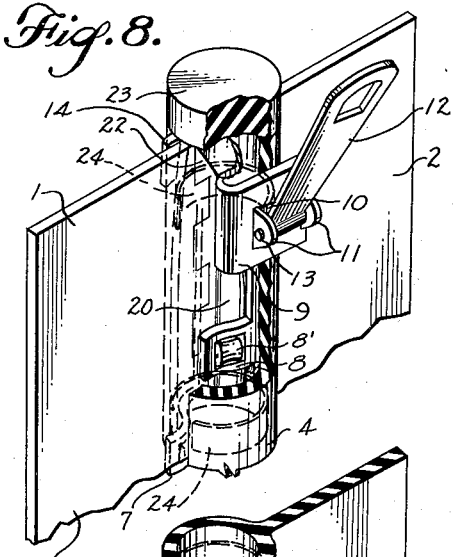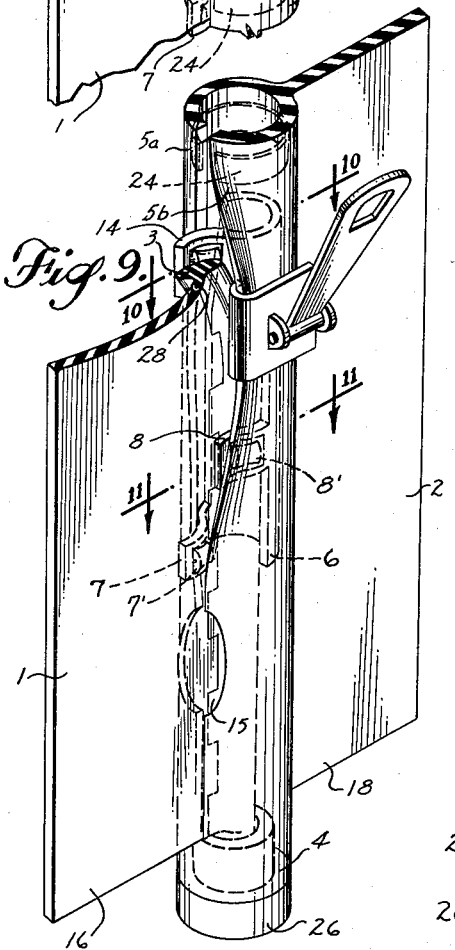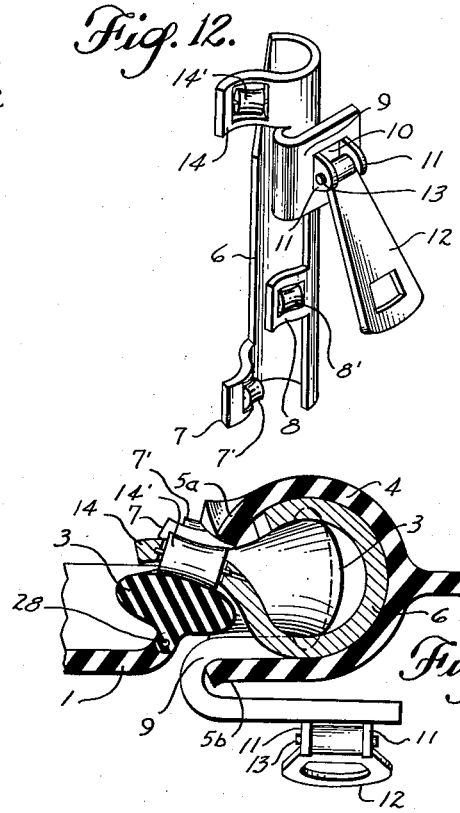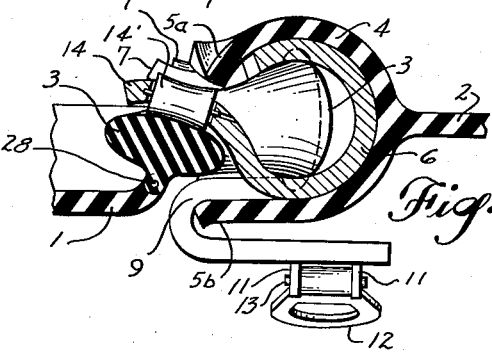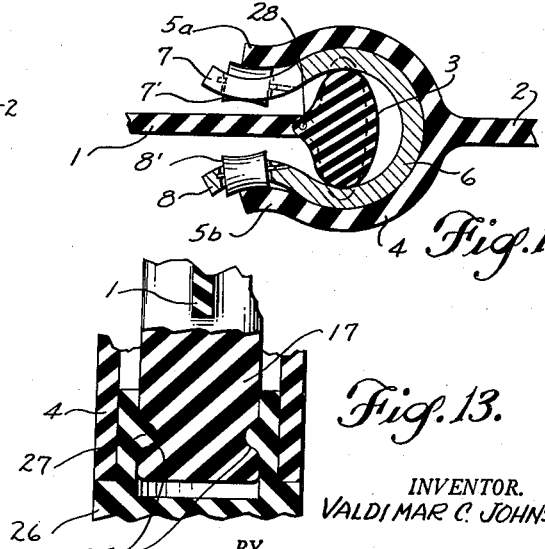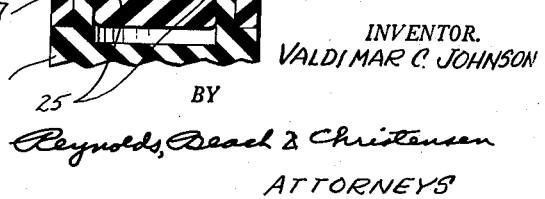
INVENTOR.
VALDIMAR C. JOHNSON
BY
Reynolds, Beach & Christensen
ATTORNEYS

United States Patent Office 2,972,792
Patented Feb. 28, 1961

2,972,792
RESILIENT RIB AND GROOVE SLIDE FASTENERS

Valdimar C. Johnson, Edmonds, Wash.
(Rte. 1, Box 3650, Issaquah, Wash.)

Filed May 31, 1955, Ser. No. 512,263

3 Claims. (Cl. 24—201)

The present invention relates to a slide fastener having interengageable strip components adapted to be secured respectively to the edges of elements to be interconnected, such as portions of a garment, and the components of the fastener include, respectively, interfitting rib and groove members.

An object of the present invention is to provide in a slide fastener interfitting rib and groove members of resilient character which are continuous and which can be engaged and disengaged by deformation of the respective members.

A further object is to provide a slide fastener incorporating interfitting rib and groove members which are compact yet will provide a connection which will hold together securely parts to be joined. Because of the continuous character of the rib and groove members, the joint will be more resistant to passage of air through it than is an interrupted type of separable fastener joint.

Another object is to provide a separable fastener which is very durable, neat in appearance and quiet to operate. Moreover, such a separable fastener is more satisfactory in operation since it is practically impossible to jam and is highly wear resistant.

It is also an object to provide such a separable fastener which can be manufactured economically and the structure of which need not be held to small tolerances. Not only is such a slide fastener easy to operate, but it can be disassembled readily. Having few components of simple construction, this slide fastener can be manufactured very economically.

In general, the slide fastener is composed of three principal components including a rib member, a groove member into which the rib of the rib member may fit, and a slider the major portion of which is received within the groove of the groove member, embraces the rib of the rib member and operates to spread the entrance slot to the rib receiving groove and to guide movement of the rib through such entrance slot into and out of the groove. Preferred rib member, groove member and slider structures are shown in the drawings.

Figure 1 is a top perspective view of one end portion of a slide fastener showing the rib member and the groove member completely engaged, parts being broken away to reveal internal structure.

Figure 2 is a top perspective view of the other end portion of a slide fastener showing the rib member in the process of being engaged with or disengaged from the groove member.

Figure 3 is a top perspective view of the slider component.

Figure 4 is a longitudinal sectional view through an end portion of the rib and groove.

Figure 5 is a transverse sectional view through the separable fastener and slider taken on line 5—5 of Figure 2, showing the rib member and the groove member engaged. Figure 6 is a similar transverse sectional view taken on line 6—6 of Figure 2 with the rib member and the groove member interengaged. Figure 7 is a transverse sectional view similar to Figure 6 but with the rib member and the groove member disengaged.

Figure 8 is a top perspective view of one end portion of the separable fastener with parts broken away similar to Figure 1 but showing a modified type of construction.

Figure 9 is a top perspective view of the other end portion of a separable fastener of the type shown in Figure 8, parts being broken away.

Figure 10 is a transverse sectional view through the separable fastener taken on line 10—10 of Figure 9, and Figure 11 is a transverse sectional view taken on line 11—11 of Figure 9.

Figure 12 is a top perspective view of the slider employed in the separable fastener of the type shown in Figures 8 and 9.

Figure 13 is an enlarged longitudinal sectional view through an end portion of the slide fastener.

In the drawings the slide fastener is illustrated as being constructed for application to edges to be joined such as an opening in a garment, for example. The components of the slide fastener, therefore, include two strips 1 and 2, as shown in Figures 1 and 2, for example, which may be secured respectively to the edges to be connected, such as by being sewed or bonded to such edges. Integral with one edge of strip 1 and extending unbrokenly along it is the bulb or rib 3. The strip defines a plane substantially bisecting such bulb, as shown in Figures 5, 6 and 7, and preferably the bulb is of substantially elliptical shape in cross section having its major axis disposed transversely of the plane of the strip 1 and its minor axis disposed parallel to or in the plane of such strip.

Integral with the other strip 2 and extending along one edge of it is a socket groove member 4 of substantially circular cross section and of a size to receive within it the bulb 3 on the strip 1 with some clearance. A slot 5 extends lengthwise of the socket groove member through which the bulb 3 may be inserted when such slot is spread, as discussed hereinafter. Such slot preferably is located in the socket member diametrically opposite the strip 2, and such strip extends radially outward from the socket member.

Resilience of the grooved socket member is relied upon to retain the bulb or rib 3 within it to interconnect positively the strips 1 and 2. In order to reduce as far as possible the necessity for the slot 5 in the socket member to be spread to enable the bulb 3 to be inserted through it, it is preferred that such bulb be turned relative to the plane of the strip 1 so that the major axis of the bulb 3 instead of being perpendicular to a radial plane of the socket 4 through the slot 5 will be turned toward parallelism with such radial plane. This purpose can be accomplished by twisting relative to the strip 1 that portion of the bulb which is being inserted or withdrawn through the slot 5.

To enable the bulb to be twisted relative to the plane of the strip it is necessary for the strip or the connection between the bulb and the strip to be yieldable, and preferably such construction is resilient, so that when the bulb has been inserted within the socket groove in the position shown in Figure 6, it will resume its relationship to the strip 1 such that the strip will be disposed in a plane perpendicular to the major axis of the bulb, and such plane will bisect the bulb. The local twisting movement of the bulb 3 relative to its mounting strip can be effected by a slider of proper design which is capable of joining and separating the bulb 3 and its socket 4.

A slider suitable for effecting movement of the bulb 3 into or out of the socket groove 4 through the slot 5 is shown in Figure 3. This slider includes an arcuate trough-shaped body 6 from the edges of which project fingers for manipulating the interengageable elements of the slide fastener. Two of these fingers 7 and 8 project from opposite edges of the slider body and have tips engageable respectively with the opposite edges of the slot 5. These fingers are disposed in staggered relationship and each is of ogee contour, so that as shown in Figures 2 and 5 each edge of the socket member forming a side of the slot 5 lies in a concave portion of a finger.

The fingers 7 and 8 effect preliminary spreading of the slot 5 and the engagement of the concave tips of such fingers with the edges of the slot prevent rotation of the trough-shaped body 6 relative to the socket member. As shown best in Figure 5, the curvature of the outer side of slider body 6 is complemental to the curvature of the interior of the socket. It is preferred that the fingers 7 and 8 be offset lengthwise of the slider body 6 sufficiently so that they do not overlap at all, thus reducing the amount of spreading of the sides of slot 5 at any given location and preferably these fingers are offset sufficiently to allow a reasonable spacing between them lengthwise of the body 6 as shown in Figure 3.

The principal spreading of the access slot 5 is accomplished by a finger 9 projecting from the same edge of the trough-shaped body 6 as finger 8, which is closer to the finger 9 than finger 7. Finger 9 is of return bend shape so that its outer end overlaps and lies alongside an outer side of the socket element 4. An aperture 10 is cut in the outer end of finger 9 and from it are bent outward ears 11 between which is received one end of the handle 12. This handle is pivoted to the ears 11 by the pivot pin 13 to swing between a lowered position shown in Figure 3 and a raised position shown in Figures 1 and 2. This handle may be grasped to move the slider in one direction or the other along the socket groove member 4.

At the side of finger 9 remote from fingers 7 and 8 still another finger 14 in the form of a strip of a width much less than the length of the slider which projects from the same edge of the trough-shaped slider body 6 as fingers 8 and 9, and this finger also is of ogee shape. Instead of being as short as the fingers 7 and 8, however, the finger 14 is considerably longer and, as shown best in Figure 2, projects across the slot 5 to a location adjacent to the opposite side of the slot from that adjacent to its root portion. This crossover finger, as shown in Figure 2, is therefore effective to scoop out of the slot 5 the rib or bulb 3 carried by the strip 1. On the contrary, as the slider is moved so that the crossover finger 14 is adjacent to the leading end of the slider, the bulb or rib will be guided through the slot 5 into the socket groove by finger 14 to interengage the bulb and socket elements.

It is preferred that the separable fastener be formed so that the bulb element and the socket element can be separated completely. To facilitate such manipulation a portion of slot 5 adjacent to one end is enlarged to form the aperture 15 shown in Figure 2. This aperture is located so that a portion of the slider can move beyond the aperture. Thus the slider may be moved downward from the position shown in Figure 2 until both fingers 7 and 8 are engaged with the edges of the slot below the slider. The return bent finger 9 and the crossover finger 14 may be located at the other side of aperture 15.

The rib 3 projects downward below the lower end 16 of the strip 1 to form a tip 17. This tip may be inserted between the lugs 8 and 9 through the aperture 15 into the interior of socket groove member 4. This socket groove may extend downward below the lower end 18 of strip 2, as shown in Figure 2, and may be constricted by a wire band 19 which can completely encircle the projecting end of the socket member or constitute a resilient clamp extending around a major portion of the socket projection. In either case, as shown best in Figure 4 the tip 17 can be pushed past the constriction formed by the band 19 a distance sufficient to produce a firm frictional grip of the socket on the projecting tip of the rib.

When the rib tip 17 has been inserted in this fashion through the aperture 15, the portion of the strip 1 below such aperture will have been inserted into the lower portion of the slot 5 and the lower end 16 of strip 1 will be substantially in alignment with the lower end 18 of strip 2. With the lower ends of the rib and socket thus interengaged, the rib portion just above the aperture will lie across the outer arcuate face of the finger 14 which prevents this portion of the rib from entering the socket groove. As the slider is pulled upward from a position in registry with aperture 15, however, the return bent finger 9 will spread the portion of slot 5 immediately above the aperture as the slider is raised to afford sufficient passageway for the bulb 3 to enter the socket groove.

At the same time contact of the side of the bulb 13 opposite strip 1 will cause the major axis of the bulb's cross section to twist from a position perpendicular to the plane of strip 1 to a position more nearly parallel to the plane of strip 1 and strip 2. Such twisting of the bulb will enable it to enter generally edgewise through slot 5, so that finger 9 need not spread its side of the slot as far as otherwise would be required. The opposite edge of the bulb thus twisted will bear against the other edge of the slot 5 to assist in spreading the slot opening sufficiently to enable the bulb to pass through it. As the slider is moved progressively along the tubular socket member, the finger 9 will spread succeeding increments of the slot 5. The portions of the slot released by the fingers 7 and 8 will be moved into the closed position shown in Figure 6 by the resilience of the elastomer material of which the socket groove member 4 and its strip 2 are made.

Similarly, the elastomer material of which the strip 1 is made will enable the bulb to be twisted relative to the strip as described above and as shown in Figure 2 without damage to the rib member, and after the bulb has passed through the slot 5 the resilience of the elastomer material end strip 1 will restore the bulb to a position in which the major axis of its bulb cross section again is disposed perpendicular to the plane of strip 1. Preferably the bulb portion 3 also of the rib member is made of elastomer material and has a major axis almost equal to the internal diameter of the socket member 4. As has been mentioned previously, it is preferred that the slider body have an external curvature complemental to the internal curvature of the socket body, and the internal diameter of the slider body 6 may be somewhat less than the major axis of the bulb 3.

Since the minor axis of the bulb 3 preferably is considerably shorter than the major axis of such bulb and also considerably shorter than the internal diameter of the slider body 6, the shape of the bulb 3 may be altered somewhat as the slider passes between it and the grooved member. Figure 5 shows that the slider effects a squeezing action of the major dimension of the bulb 3 so that this dimension is reduced somewhat while the bulb is correspondingly deformed to increase the length of its minor axis. The bulb 3 is therefore of a character which is capable of being deformed to enable the slider to pass between it and the socket member, but which thereafter will expand in the direction transversely of the strip 1 so as to extend almost entirely across the socket in the manner shown in Figure 6.

When the slider reaches the end of the grooved member remote from aperture 15 it is not desirable for the strip 1 to be twisted or bent in the manner shown at the upper portion of Figure 2. For that reason the end of the bulb 3 remote from the tip 17 is tapered at 20 to an end spaced from the end 21 of strip 1 remote from the end 16 of such strip. Moreover, the edge 22 of this strip extending beyond bulb 3 terminates in an incline which will afford sufficient clearance for the crossover finger 15 without any bending or buckling of the strip 1. With the slider in the limiting position shown in Figure 1, as established by the end closure 23 of the socket groove, the two strips 1 and 2 will consequently lie in a common diametral plane of the groove member 4 passing through the slot 5 and perpendicular to the major axis of the bulb member 3.

For some purposes, and particularly where stiffer material is utilized for the rib and socket members, or a tighter fit is desired, it may be advantageous to reduce the friction and wear between the slider and the rib and socket members. For this purpose rollers may be provided on some or all of the fingers 7, 8 and 14, projecting from the edges of the slider body 6. In Figures 8 to 11, inclusive, cooperating rib and socket members provided with a slider having such rollers are shown. The slider itself is illustrated in Figure 12.

As best shown in Figures 8, 11 and 12, the two fingers 7 and 8 have rollers 7' and 8', respectively, received in apertures in the fingers. These rollers have concave peripheries and rotate about axles extending generally lengthwise of the fingers and transversely of the trough-shaped slider body 6 of the rib 3 and of the socket member 4. These two rollers will roll on the respective edges 5a and 5b of the socket entrance slot 5. Such roller action is shown best in Figure 11. If desired, a roller could also be applied to finger 9 in a similar manner, but Figure 10 shows that a surface of this finger is contacted by a substantial area of the socket member 4 and consequently there is less advantage gained by provision of a roller because of the absence of concentrated pressure.

In the crossover finger 14 an aperture is provided in which a roller 14' is received near the outer end of such finger. This roller also has a concave periphery and preferably such roller periphery is of a contour complemental to the convex curvature of the portion of rib 3 which it engages in the manner shown in Figure 10. It will be evident from Figures 8, 9, 10 and 11 that the bulb and socket members and the slider all operate in the same way where rollers are provided on the slider as without rollers. It is therefore not necessary to repeat the description of the slide fastener operation given above.

In Figures 8 and 9 the groove or socket member 4 is shown as incorporating reinforcing or stiffening springs 24 embedded in the elastomer material of which the socket member is made at intervals along the length of the socket member. Such stiffening spring members maintain the socket member closed more positively except when the slider is passing such a reinforcing member. Such members may be made of resilient sheet metal or plastic material.

Also Figures 9 and 13 show a somewhat different end connection for the rib and socket members from that shown in Figures 2 and 4. In this instance the projecting tip 17 may have a peripheral groove 25 actually formed in each of its opposite edges. A socket end piece 26 is inserted in the lower projecting portion of the socket member 4 and may be permanently bonded to such member 4. This end piece has opposite inwardly projecting ribs 27 engageable with the grooves 25 by pushing the tip downward in the grooved member as explained in connecticon with Figure 4. Preferably the end piece 26, as well as the tip 17 of the rib member is made of elastomer material, although such end piece can be effective with considerably less resilience than the elastomer material of which the rib and groove members are made because of the deformable character of the rib member. Figure 11, for example, shows the shortening of the major axis of such rib member and the expansion of its minor axis effected by engagement of the slider with the rib member.

To reduce the effort required to operate the slide fastener of Figures 8 to 11, inclusive, where relatively stiff material is employed for the rib member, a further modification may include the formation of the strip 1 and the rib element 3 as separate members which are interconnected adjacent to the bulb 3 by a piano-type hinge 28. This construction enables the strip 1 and the bulb 3 to be constructed from material having different stiffness or resiliency characteristics. The hinge also affords a line of flexure between the strip 1 and the rib 3 which will facilitate twisting of the bulb relative to the strip in the manner shown in Figures 9 and 10 as the bulb is being moved into or out of the groove member 4.

I claim as my invention:

1. A separable fastener comprising a strip having along one edge thereof a rib always of greater width transversely of said strip than parallel to the plane of said strip when the portion of said strip adjacent to said rib is in planar condition, a grooved member for receiving said rib therein and having an access slot extending lengthwise therealong, a slider interengaged between said rib and said grooved member and including a projection engageable with said rib to twist it adjacent to the location of such engagement and, progressively along the length of said rib, to effect movement of said rib generally edgewise through such access slot, the rib tapering toward and to an end short of the corresponding end of the strip, and the edge of the strip between such tapered end of the rib and the adjacent end of the strip being inclined toward such corresponding end of the strip in a direction away from the rib.

2. In a separable fastener, a slider including a trough-shaped body of sheet material having two fingers of oppositely curved ogee shape projecting from opposite edges of said trough-shaped body, respectively, and spaced apart a substantial distance lengthwise of said slider but disposed generally in aligned registry lengthwise of said slider.

3. In a separable fastener, a slider including a trough-shaped body of sheet material having two fingers of ogee shape projecting from opposite edges of said trough-shaped body, respectively, and spaced apart a substantial distance lengthwise of said slider.

References Cited in the file of this patent

UNITED STATES PATENTS

| | | |
|---|---|---|
| 1,887,741 | Trotter | Nov. 15, 1932 |
| 2,141,900 | Brown | Dec. 27, 1938 |
| 2,192,013 | Marinsky | Feb. 27, 1940 |
| 2,306,488 | Morner | Dec. 29, 1942 |
| 2,452,899 | Brown | Nov. 2, 1948 |
| 2,491,524 | Siple | Dec. 20, 1949 |

FOREIGN PATENTS

| | | |
|---|---|---|
| 383,319 | Great Britain | Nov. 17, 1932 |
| 463,083 | Italy | Apr. 14, 1951 |